United States Patent [19]

Suga et al.

[11] 3,990,108
[45] Nov. 2, 1976

[54] MAGNETIC TAPE SPEED CONTROL SYSTEM

[75] Inventors: Tokuji Suga, Neyagawa; Toshio Katagiri, Kawasaki, both of Japan

[73] Assignee: Matsushita Electric Industrial Co., Ltd., Osaka, Japan

[22] Filed: July 21, 1975

[21] Appl. No.: 597,336

Related U.S. Application Data

[63] Continuation of Ser. No. 383,654, July 30, 1973, abandoned.

[30] Foreign Application Priority Data

| Sept. 13, 1972 | Japan | 47-92679 |
| May 9, 1973 | Japan | 48-51876 |
| Aug. 2, 1972 | Japan | 47-91365[U] |
| Aug. 2, 1972 | Japan | 47-91364[U] |
| Aug. 7, 1972 | Japan | 47-92906[U] |
| Feb. 20, 1973 | Japan | 48-22369[U] |
| Feb. 20, 1973 | Japan | 48-22370[U] |

[52] U.S. Cl. .............................. 360/73
[51] Int. Cl.$^2$ ............. G11B 15/46; G11B 19/28
[58] Field of Search ..................... 360/73, 121

[56] References Cited
UNITED STATES PATENTS

| 3,287,713 | 11/1966 | Porter | 360/121 |
| 3,662,098 | 5/1972 | Yano et al. | 360/73 |
| 3,666,883 | 5/1972 | Yano et al. | 360/73 |

Primary Examiner—Robert S. Tupper
Attorney, Agent, or Firm—Stevens, Davis, Miller & Mosher

[57] ABSTRACT

A magnetic recording and reproducing system for a magnetic tape provided with a control track for recording and reproducing a control signal separately of data recording and reproducing tracks. The recording and reproduction of the control signal are effected by a special magnetic head provided to face the control track for detecting the speed of the magnetic tape, the detection signal thus obtained being used to control the magnetic tape drive motor.

5 Claims, 20 Drawing Figures

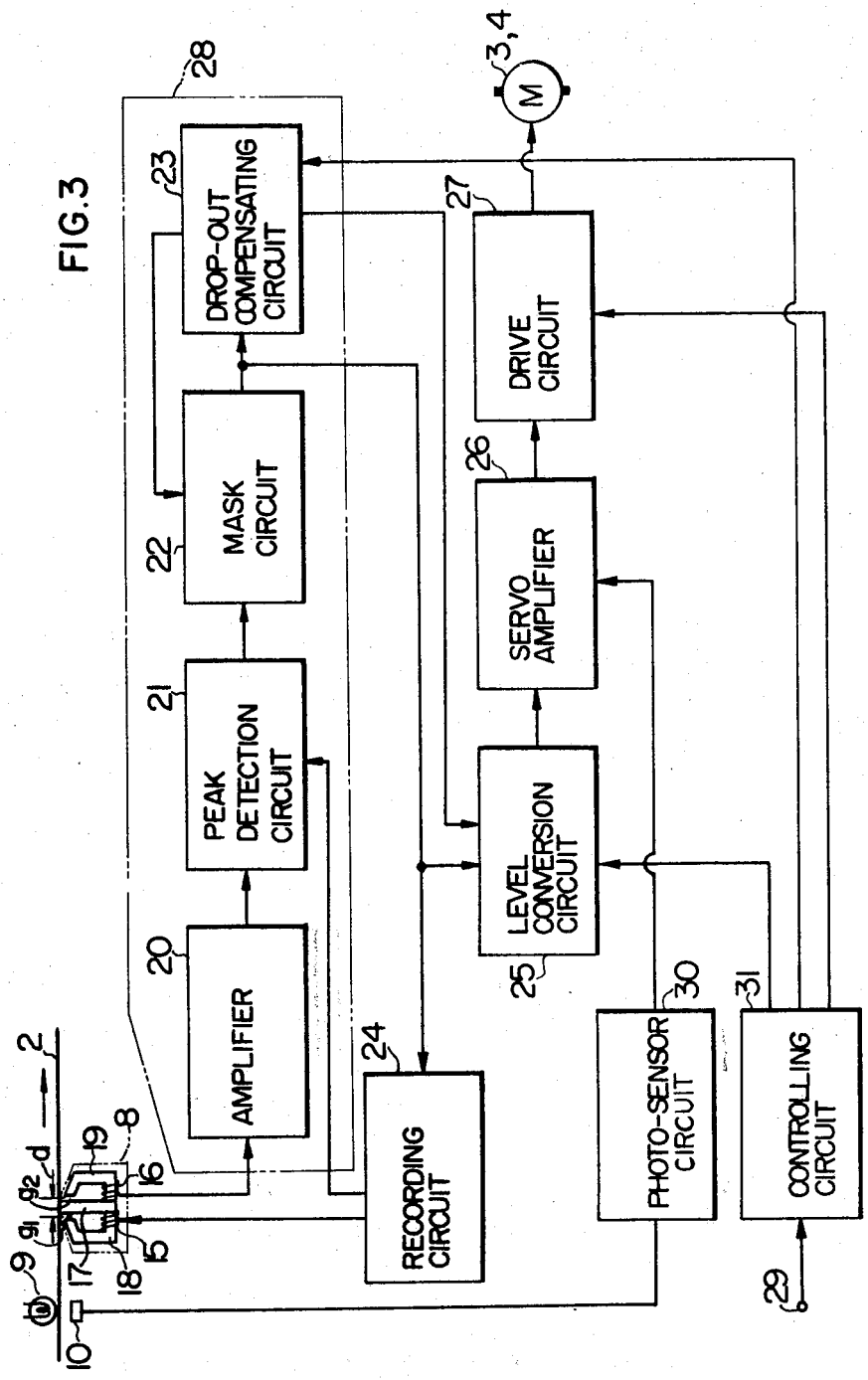

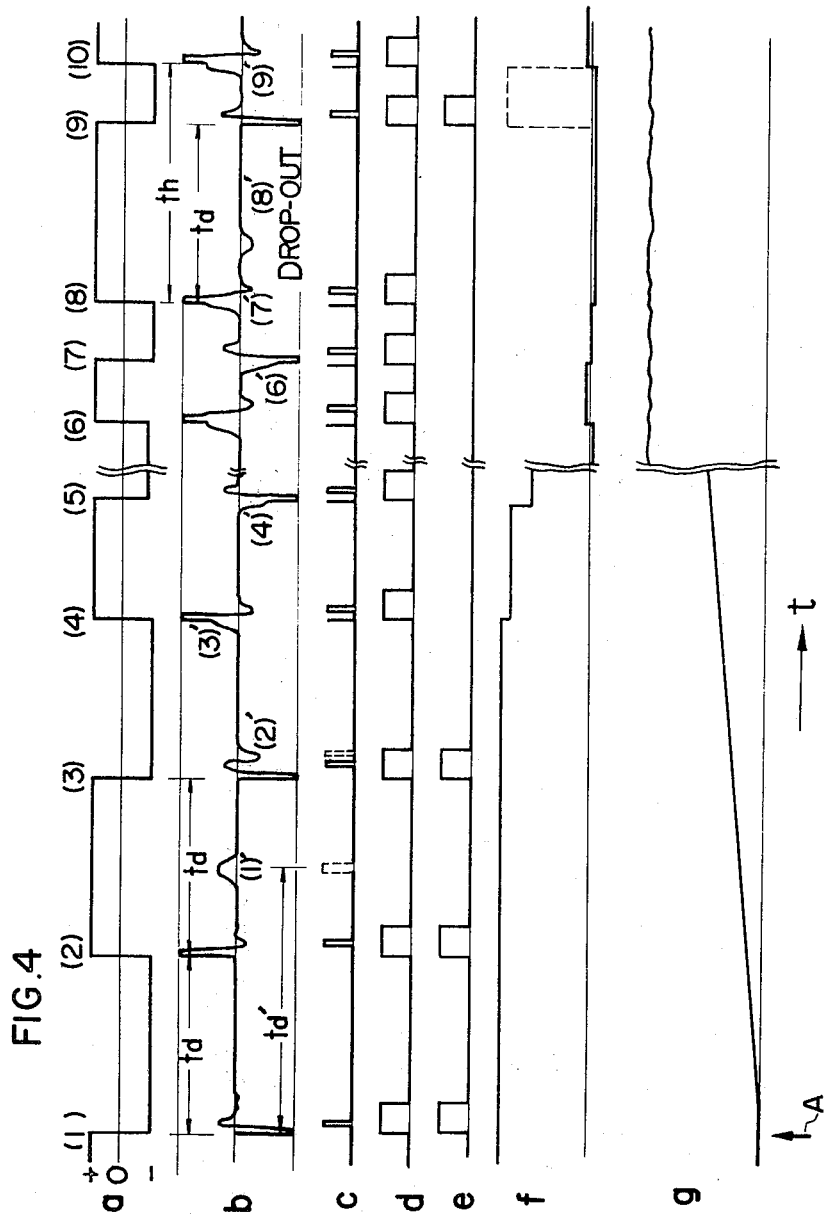

MAGNETIC TAPE SPEED CONTROL SYSTEM

This is a continuation of application Ser. No. 383,654, filed July 30, 1973, now abandoned.

This invention relates to magnetic recording and reproducing systems and, more particularly, to magnetic recording and reproducing systems where the speed of the magnetic tape can be controlled.

As a prior art magnetic recording and reproducing system, there is a data recorder using a Phillips type cassette tape. In this type of data recorder, the magnetic tape is driven by means of a capstan and a pinch roller urged thereagainst through the tape. In such pinch roller and capstan system, however, dust is likely to attach to the pinch roller and be transferred to the tape. Also, it is technically difficult to feed the tape at a speed higher than 15 inches per second. Due to these drawbacks, the reel drive system has recently been attracting attention. While the reel drive system is free from the problems inherent in the pinch roller and capstan system, in this system the tape speed control has been difficult.

An object of the present invention is to provide a magnetic recording and reproducing system, which adopts a reel drive system and nevertheless ensures stabilized tape speed through the control of a magnetic tape drive motor by directly detecting the speed of the magnetic tape with a special head.

Another object of the invention is to obtain a correct tape speed detection signal by eliminating the effect of a recording coil from the reproduced output of the special head.

A further object of the invention is to stably and steadily feed the magnetic tape by providing measures against the dropping-out of the output of the special head and appropriately dealing with the leader tape.

In the magnetic recording and reproducing system according to the invention, the magnetic tape speed is controlled by directly detecting it, so that it is possible to obtain a constant tape speed with the reel drive. Thus, unlike the pinch roller and capstan system there is no such problem as the winding of the tape on the pinch roller or capstan. Also, it is possible to increase the tape speed, and less dust is likely to attach to the tape. Further, the mechanical construction is very simple, and high mechanical reliability can be ensured since it is possible to realize a construction where the drive motor is the sole movable part. Furthermore, since there are provided means for removing the effects of the recording coil upon the reproducing coil, a drop-out compensating means and means dealing with the leader tape, steady and reliable operation can be ensured.

The above and other objects, features and advantages of the present invention will become more apparent from the following description taken in conjunction with the accompanying drawings, in which:

FIG. 3 is a block diagram showing the circuitry in the same magnetic recording and reproducing system;

FIGS. 4a–4g are a waveform chart illustrating the operation of the circuitry;

Figure 1:
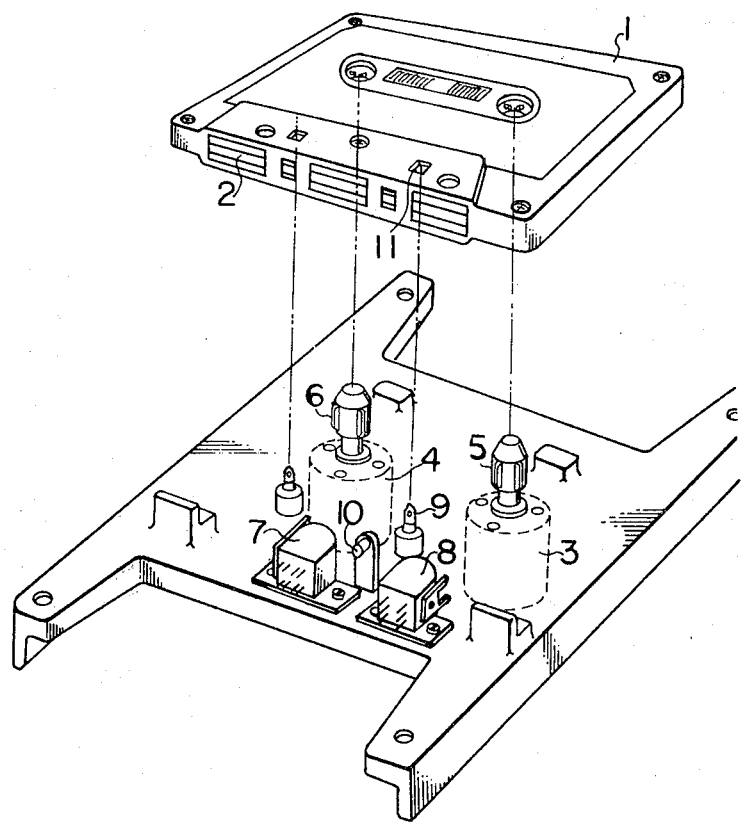
FIG. 1 is an exploded perspective view showing essential mechanical parts of an embodiment of the magnetic recording and reproducing system according to the invention.
Figure 2:
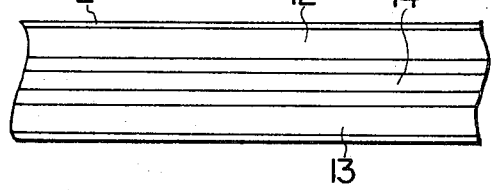
FIG. 2 shows the format of a magnetic tape used.

An embodiment of the invention applied to a Phillips type cassette tape is shown in FIGS. 1 to 3, FIG. 1 showing the mechanical construction, FIG. 2 showing the tape format, and FIG. 3 showing the electrical circuit.

Referring to FIG. 1, there is shown a tape cassette 1 accommodating a magnetic tape 2. It is driven by reel caps 5 and 6 respectively secured to a take-up motor 3 and a supply motor 4. Numeral 7 designates a read and write head, and numeral 8 designates a control head having a special construction. The magnetic tape 2 has a format as shown in FIG. 2. A lamp 9 and a photosensor 10 are provided for detecting a leader tape provided at each end of the magnetic tape 2. The lamp 9 is inserted in a positioning hole 11 provided in the tape cassette 1, and the leader tape is adapted to run between lamp 9 and photo-sensor 10.

As shown in FIG. 2, the tape 2 has two channels 12 and 13 constituting respective data tracks. The reading from and writing in of these data tracks 12 and 13 are effected by the head 7. The head 8 effects reading from and writing in of a control track 14 provided between the data tracks 12 and 13. This control track is narrow, having a width of about 0.4 millimeters lest it should overlap the data tracks 12 and 13 even with the smallest distance between the data tracks prescribed, for instance, by ISO standards. Thus, the data tracks are never affected by the provision of this control track 14.

Referring to FIG. 3, indicated at 2 is the magnetic tape, and indicated at 8 is the head for recording and reproducing signals representing the speed of the magnetic tape 2 on and from the control track 14 as shown in FIG. 2.

The head 8 consists of a central core 17 and side cores 18 and 19 provided on opposite sides of the central core. A recording coil 15 and a reproducing coil 16 are wound on the respective side cores 18 and 19. On the side of the head tip in contact with the tape, the side cores 18 and 19 define respective head gaps $g_1$ and $g_2$ with respect to the central core 17. Thus, a signal recorded at the gap $g_1$ by a signal flowing through the recording coil 15 is taken out from the reproducing coil 16 at the gap $g_2$. Indicated generally at 28 is a reproducing circuit consisting of parts 20 to 23. Numeral 20 designates an amplifier for amplifying the signal output of the reproducing coil 16. Numeral 21 designates a peak detection circuit for detecting the peak of the amplifier output signal, and it includes means for selectively reading either positive or negative signal outputs of the amplifier 20. Numeral 22 designates a mask circuit, which provides an output when a peak point is detected by the peak detection circuit 21. The output of the circuit 22 is supplied to a drop-out compensating circuit 23, and it is also supplied as the output of the reproducing circuit 28 to a recording circuit 24 and a level conversion circuit 25. The recording circuit acts to reverse the current flowing in the recording coil 15 of the head 8 every time it receives a signal from the mask circuit 22, and it also gives a signal corresponding to the direction of current in the recording coil to the peak detection circuit 21. The current flowing in the recording coil 15 has such a level that the magnetic tape 2 is completely saturated at the gap $g_1$. In order to provide for fine and smooth control of the speed of the magnetic tape 2, the gaps $g_1$ and $g_2$ are spaced apart by an extremely small distance (200 to 400 micrometers in practice). Therefore, when the current flowing in the recording coil 15 is reversed upon detection of a peak by the peak detection circuit 21, an unnecessary voltage will be induced in the reproducing coil 16 due to leakage magnetic flux from the recording coil 15, so that it is likely that the peak detection circuit 21 is actuated once again. The mask circuit 22 is provided to eliminate such undesired signal. More particularly, the undesired signal is eliminated by holding the output of the mask circuit 22 at a constant level, i.e., either low level or high level, after the detection of a peak by the peak detection circuit 21 for a period longer than the delay time involved when a signal is produced in the peak detection circuit due to the effects of the recording coil 15 irrespective of the output of the peak detection circuit. Numeral 23 designates a drop-out compensating circuit, which functions to deliver a signal to the mask circuit 22 so as to repeat the recording by the head 8 if the mask circuit 22 produces no output for a period several times as long as the time interval between consecutive signals in the normal run such as in case when a signal is dropped out due to malfunctioning of the reading system.

The drop-out compensating circuit 23 delivers a signal to the level conversion circuit 25 in case a drop-out occurs. Further, the drop-out compensating circuit 23 starts its operation in synchronization with a magnetic tape drive signal delivered from a control circuit 31.

As noted above, numeral 25 designates a level conversion circuit. Denoting the time interval between the two subsequent pulses given by the mask circuit 22 by $t$, the speed of the magnetic tape by $v$ and the distance between the gaps $g_1$ and $g_2$ of the head 8 by $d$, there holds a relation $v = d/t$. In other words, the reciprocal of the time interval between the pulses $t$ is proportional to the magnetic tape speed $v$. Thus, the circuit 25 produces a signal corresponding to the tape speed from the output signal of the mask circuit. While the signal delivered from the drop-out compensating circuit in such a case as when a signal from the reproducing coil 16 is dropped out reverses the current flowing in the recording coil 15 to repeat the recording, the time interval between the pulses provided by the mask circuit 22 at such time has no bearing upon the speed of the magnetic tape 2, but this signal only commands to hold the previous state of the output of the level conversion circuit 25 in such case. Where no tape drive signal is supplied to the level conversion circuit 25 from the control circuit 31, the level conversion circuit 25 is designed to produce an output signal which corresponds to very slow tape speed.

Numeral 26 designates a sevo amplifier, which receives the signal corresponding to the tape speed produced by the level conversion circuit 25 to produce a corresponding control signal to be supplied to the take-up motor 3 and supply motor 4. Numeral 30 designates a photo-sensor circuit. It couples a signal produced from the photo-sensor 10 with the transparent leader tape at either end of the magnetic tape to the servo amplifier 36 to let the amplifier 26 supply such voltage that a tape speed near the rated tape speed may be obtained when the tape end passes by the head to the take-up motor. This is done because, for the leader tape portion, the head 8 cannot record and reproduce any signal, and hence it is impossible to detect the speed of the tape 2. When a leader tape signal is supplied to the servo amplifier 26 from photo-sensor circuit 30, the servo amplifier 26 produces an output which enables the take-up motor 3 to drive the magnetic tape so that the speed of the tape reaches substantially a setting speed when a track end of the tape is at the position of the read and write head 7.

Numeral 27 designates a drive circuit to supply a voltage to the take-up motor 3 according to the output signal of the servo amplifier 26. Numeral 29 designates a tape drive signal terminal connected to a control circuit 31. When a tape drive signal is applied, the control circuit 31 causes the drive circuit 27 to supply a voltage corresponding to the output of the servo amplifier 26 to the motor 3 for driving the magnetic tape 2. At the time of starting, the output signal of the level conversion circuit 25 is set to a level corresponding to a very slow speed of the magnetic tape by a signal from the control circuit 31. Therefore the drive circuit fully energizes the drive motor to get a normal tape speed at the start time. When no signal is supplied from the control circuit 31, the energization of the take-up motor 3 by the servo amplifier 26 is cut off.

FIG. 4 shows waveforms produced at various parts of the system. Indicated at $a$ is the current flowing through the recording coil 15, at $b$ the output of the reproducing coil (output of the amplifier 20), at $c$ the output of the peak detection circuit 21, at $d$ the output of the mask circuit 22, at $e$ the signal given from the drop-out compensating circuit 23 to the level conversion circuit 25, at $f$ the output of the level conversion circuit 25, a signal corresponding to the speed of the magnetic tape (in this example, the level of the signal is high when the tape speed is low and is reduced with an increase of the tape speed), and at $g$ the speed of the magnetic tape. The abscissa represents time, and the chart shows the states at the rise time and during the normal run. Arrow A indicates an instant when a signal is given to the tape drive signal terminal 29.

In the example of FIG. 3, the mask circuit 22 is constituted by a monostable multivibrator or like circuit, and it is triggered by the rising of an output pulse of the peak detection circuit 21 or drop-out compensating circuit 23 to produce a pulse of a predetermined duration. It is not affected to all by any trigger signal added to it during this pulse period. When a signal is given to the tape drive signal terminal 29, the drop-out compensating circuit 23 produces an output pulse to trigger the mask circuit 22 so as to invert the recording circuit 24 for recording a signal, while at the same time a voltage is supplied to the take-up motor 3 for driving one magnetic tape 2. Thereafter, unless no signal is obtained from the reproducing coil 16 during a subsequent period $t_d$ determined by the circuit parameters of the drop-out compensating circuit 23, at the end of the period $t_d$ the drop-out compensating circuit 23 provides a pulse to the mask circuit 22, so that the signal is recorded once again. The signals recorded at instants (1), (2), . . . , (10) in $a$ in FIG. 4 are respectively reproduced at instants (1)′, (2)′, . . . , (10)′ in $b$. The peak detection circuit 21 is so constructed as to selectively read only negative signals of the signals shown in $b$ in FIG. 4 when the current flowing in the recording coil 15 is positive and only positive signals when the current is negative. Thus, the signals (1)′ and (2)′ are eliminated by the peak detection circuit 21. Without this function, normal operation cannot be expected unless the time $t_d$ determined by the drop-out circuit 23 is extended to be longer than $t_d'$ shown in b in FIG. 4 for eliminating the influence of the reproduced signal (1)'. There such a degree of redundancy is required the time $t_d'$ would be double the time $t_d$. If the time period $t_d$ is made short, in case when a signal such as signal (8)' is dropped out during the normal run, the same voltage will be continuously applied to the take-up motor 3 during a period $t_h$ as shown in b in FIG. 4. However, if this period is excessively long, the tape speed will gradually get out of control, eventually resulting in a great variation of the tape speed. In practice, the time $t_d$ is set to about 3 milliseconds. With $t_d = 6$ msec., there will arise problems in the tape speed variation in case two consecutive signals are dropped out. Even in such case, there is no problem with $t_d = 3$ msec. Signals (3)' and (4)' are normally read signals. Signals eliminated by the aforementioned means are indicated by dashed lines in c in FIG. 4. The peak detection circuit 21 produces pulses in response to even undesired signals produced in the reproducing coil 16 due to leakage flux from the recording coil 15. These pulses, however, are entirely eliminated because the masking time of the mask circuit 22 is set such that these pulses occur during the operative period of the mask circuit 22.

Figure 5A:
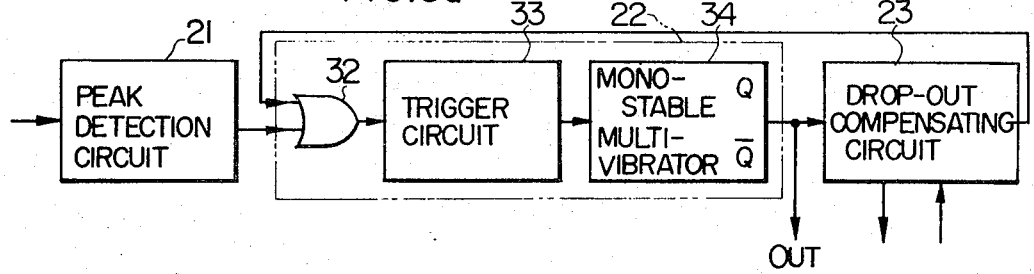
FIGS. 5a and 5b show in block form examples of the mask circuit.
Figure 5B:
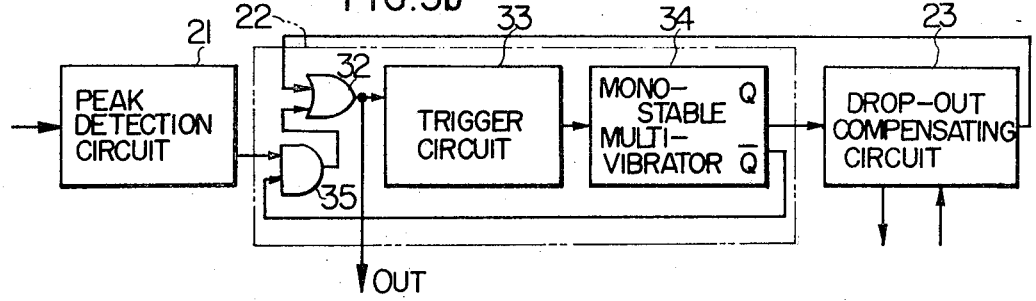

The masking of undesired signals in the reproducing circuit 28 may be obtained either by cutting or holding signals for a period beyond the instant of disappearance of the leakage flux from the recording coil 15 upon the reproducing coil 16. FIG. 5a shows an example of the holding method, and FIG. 5b shows an example of the cutting method. In FIG. 5a, numerals 21, 22 and 23 respectively designate the afore-mentioned peak detection circuit, mask circuit and drop-out compensating circuit, numeral 32 an OR element, numeral 33 a trigger circuit, numeral 34 a monostable multi-vibrator, and in FIG. 5b, numeral 35 an AND element. The system shown in FIG. 3 uses the circuit of FIG. 5a.

In case of using the circuit of FIG. 5b, the reproducing circuit 28 will produce a very thin pulse.

Figure 6:
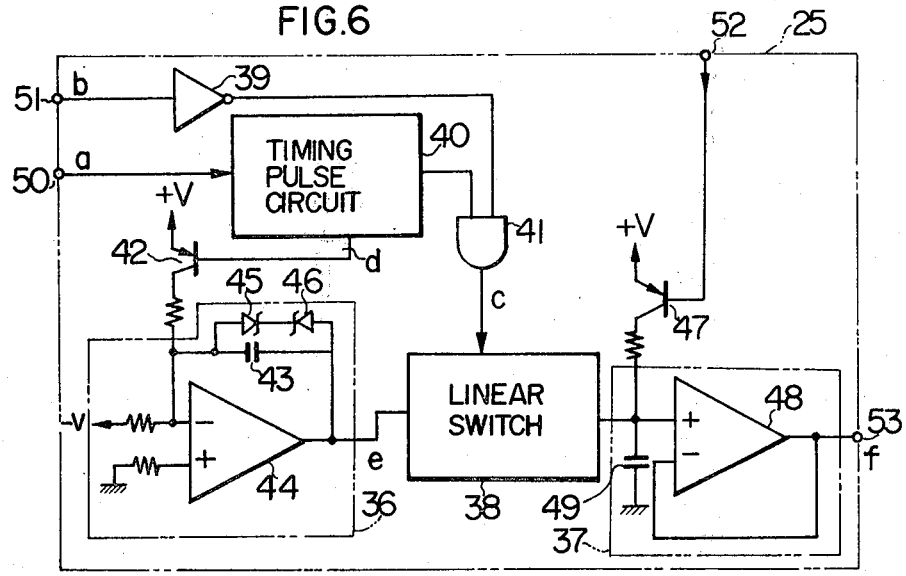
FIG. 6 is a block diagram showing an example of the level conversion circuit.
Figure 7:
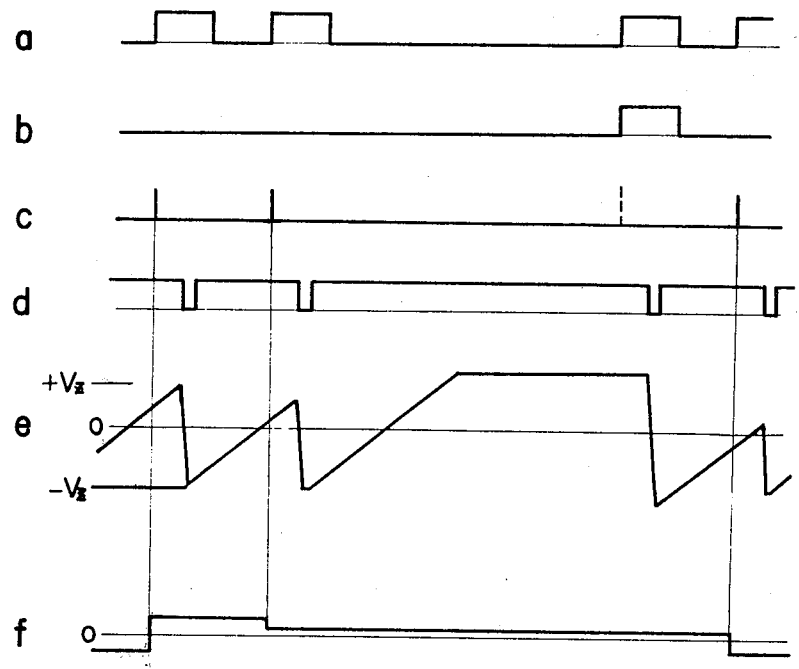
FIGS. 7a–7f are a waveform chart illustrating the operation of the same level conversion circuit.

FIG. 6 shows an example of the level conversion circuit, and FIG. 7 shows waveforms appearing at points a, b, c, d and e shown in FIG. 6. In FIG. 6, numeral 36 designates a ramp waveform generator. It has an integrating circuit consisting of an operational amplifier 44, a capacitor 43 and resistors, and it also includes Zener diodes 45 and 46 for determining a set voltage when a transistor 42 is conducting. Numeral 37 designates a voltage holding circuit comprising a capacitor 49 for holding a voltage thereacross and an operational amplifier 48 serving as a buffer. Numeral 38 designates a linear switch 38. When it receives an input signal (output of the AND element 41), it couples the output of the operational amplifier 44 to the capacitor 49 of the voltage holding circuit 37. This linear switch may be constructed by adopting a linear switch IC or similar means used in chopper circuits. Numeral 40 designates a timing pulse circuit. When a signal from the mask circuit 22 appears at a terminal 50, it delivers a pulse signal to the gate 41 and subsequently gives a pulse signal to the transistor 42. More specifically, upon appearance of a signal in a in FIG. 7 at the terminal 50 a pulse is delivered to the gate 41. At this instant, if no signal is provided from the drop-out compensating circuit 23 to a terminal 51, the AND element 41 produces a pulse output in c since an inverter 39 is provided, thus closing the linear switch 38 to cause the charging of the capacitor 49 with the output voltage of the ramp waveform generator 36. The linear switch 38 is subsequently opened, but since the discharging current from the capacitor 49 is very small the voltage at the output terminal 53 of the level conversion circuit 25 is held at the value at the instant of closure of the linear switch 38. Subsequently, when a pulse is given to the transistor 42, the output of the operational amplifier 44 is suddenly set to the Zener voltage $-V_z$ of the Zener diode 46, and the ramp waveform starts to rise again from the instant of disappearance of the pulse of the transistor 42. If a drop-out signal is applied at the terminal 51 concurrently with a signal at the terminal 50, the linear switch 38 will not be closed but only the setting of the voltage of the ramp waveform generator 36 takes place. Thus, the dashed line waveform shown at f in FIG. 4 will not be produced. In this case, therefore, the voltage holding circuit continues to hold the previous voltage. Thus, even if a signal is dropped out, there is no possibility of a great change of the voltage applied to the take-up motor 3, thus eliminating the possibility of a momentary great change of the tape speed.

Figure 8:
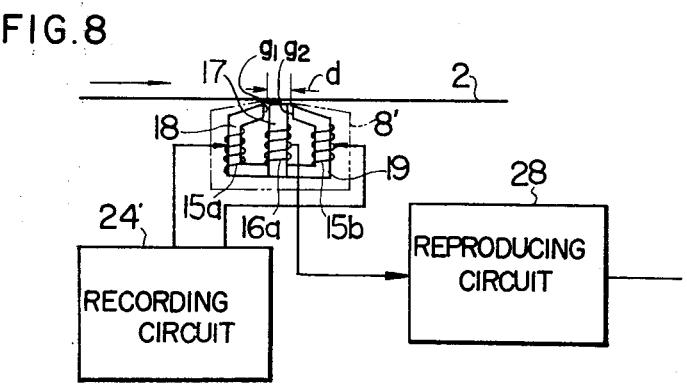
FIG. 8 shows a different magnetic head construction.

The description of the above circuit construction has been made in connection with the case of feeding the magnetic tape 2 in the direction of the arrow in FIG. 3, upper left portion. In order to be able to feed the magnetic tape also in the opposite direction while controlling the tape speed, it is necessary to arrange such as to be able to de-energize the take-up motor 3 and energize the supply motor 4 while at the same time interchanging the roles of the recording and reproducing coils such that the recording coil 15 serves as the reproducing coil while the reproducing coil 16 serves as the recording coil. The switching on the part of the recording coil may be done comparatively easily. However, a complicated circuit will be required to provide for the switching on the part of the reproducing coil because of a low signal level. To facilitate this switching, it is effective to adopt a coil arrangement as shown at 8' in FIG. 8. In this example, the reproducing coil 16a is wound on the central core 17, with its output coupled to the reproducing circuit 28. For driving the magnetic tape in the direction of the arrow, recording current is caused from a recording circuit 24' to pass through a coil 15a wound on the core 18. For driving the tape in the opposite direction, current is passed through the recording coil 15b wound on the core 19. Of course when reversing the tape run the energization of the motor must also be switched.

What we claim is:

1. A magnetic recording and reproducing system using a magnetic tape provided with a control track separately from data recording and reproducing tracks, said system comprising:
   a. a magnetic head including a recording magnetic circuit having a recording mangetic circuit gap and a reproducing magnetic circuit gap, said gaps being spaced from but close to each other, said magnetic head including a central core for contact with the magnetic tape and two U-shaped side cores each mounted on one side of said central core, said recording gap being formed between an end of one of said side cores and said central core, said reproducing gap being formed between an end of the other of said side cores and said central core;
   b. means for generating a recording signal having a polarity which is reversed alternatively to be positive and negative each time an input signal is applied to said generating means, said generating means sending the recording signal to said recording magnetic circuit which records the recording signal on the tape;

c. means, including said reproducing magnetic circuit, for reproducing the recording signal recorded on the magnetic tape and for producing a peak detection signal each time a peak point of the reproduced signal is detected;

d. masking means, connected to said generating means and to said reproducing means, for producing an output signal in response to the peak detection signal and for applying the output signal to said generating means as the input signal, the output signal being maintained at a constant level for a period until a voltage, induced in said reproducing magnetic circuit due to leakage magnetic flux produced by said recording magnetic circuit when the current therein is reversed in response to the input signal applied to said generating means, is substantially reduced to zero;

e. means, connected to said masking means, for detecting the time interval between one output signal of said masking means and the next output signal of said masking means and for producing a tape speed signal from the detected time interval, a voltage level of the tape speed signal being dependent on the speed of the tape; and f. means, connected to said detecting means, for driving the magnetic tape, said driving means including a supply reel and a take-up reel respectively coupled directly to drive shafts of drive motors, the speed of the magnetic tape being maintained at a predetermined level by controlling said drive motors in accordance with tape speed signal.

2. The magnetic recording and reproducing system according to claim 1, wherein said magnetic head comprises a reproducing coil wound on said central core, and two recording coils each wound on one of said side cores, the recording signal being supplied to either one of said two recording coils depending upon the direction of feed of the magnetic tape.

3. The magnetic recording and reproducing system according to claim 1, which further comprises a means for detecting a non-magnetic tape provided at a pay-off end or take-up end of the magnetic tape, and means for controlling the speed of the magnetic tape, and means for controlling the speed of the magnetic tape to a predetermined speed according to the output of said non-magnetic tape detecting means.

4. A magnetic recording and reproducing system according to claim 1, further comprising drop-out compensating means connected to said masking means for delivering a first signal to said masking means so as to repeat the recording of the recording signal by said magnetic head when said masking means produces no output signal for a period several times as long as the time interval between consecutive output signals from said masking means in a normal run.

5. The magnetic recording and reproducing system according to claim 4, wherein said time interval detecting means comprises a ramp waveform signal generator, a voltage holding circuit, a linear switch for coupling the ramp waveform signal to said voltage holding circuit, and means connected to said drop-out compensation means and said masking means to close said linear switch for coupling the ramp waveform signal to said voltage holding circuit and subsequently resetting the ramp waveform signal of said ramp waveform signal generator to a constant voltage and causing the rising of the ramp waveform signal afresh, said closing means connected to receive a second signal from said drop-out compensating means and being actuated not to close said linear switch but only to reset said ramp waveform signal generator upon receipt of the second signal from said drop-out compensating means.

* * * * *